United States Patent [19]
Larsen

[11] Patent Number: 5,328,709
[45] Date of Patent: Jul. 12, 1994

[54] FOLDED ARTICLE PREPARATION FROM PLASTIC MATERIAL SHEETS

[75] Inventor: Hans K. Larsen, Aestorp, Sweden
[73] Assignee: Nestec S.A., Vevey, Switzerland
[21] Appl. No.: 17,028
[22] Filed: Feb. 12, 1993

[30] Foreign Application Priority Data
Mar. 6, 1992 [EP] European Pat. Off. ........ 92103810.5

[51] Int. Cl.$^5$ ........................... A21D 6/00; A21C 9/00
[52] U.S. Cl. .................... 426/502; 99/450.6; 99/450.7; 426/297
[58] Field of Search ............. 426/496, 502, 275, 297; 99/450.4, 450.6, 450.7; 425/394

[56] References Cited

U.S. PATENT DOCUMENTS

| | | | |
|---|---|---|---|
| 3,690,895 | 9/1972 | Amadon et al. | 426/502 |
| 3,865,963 | 2/1975 | Gugler | 426/297 |
| 4,516,487 | 5/1985 | Madison et al. | 99/450.7 |

FOREIGN PATENT DOCUMENTS

| | | |
|---|---|---|
| 1290704 | 9/1972 | United Kingdom . |
| 2243281A | 10/1991 | United Kingdom . |

Primary Examiner—George Yeung
Attorney, Agent, or Firm—Vogt & O'Donnell

[57] ABSTRACT

Sheets of a foldable plastic material are folded by operation of two conveyors. A first conveyor has a conveying belt run having a downstream run end which is reciprocable for extending the run for a distance and then retracting the run. A second conveyor is rotatable and positioned so that at a first position, it has a conveying belt run in a longitudinal end-to-end relationship with the conveying belt run of the first conveyor for conveying a sheet of foldable material from the conveying run of the first conveyor to the conveying run of the second conveyor and so that at a second position, the second conveyor is, with respect to the first position, substantially inverted and so that the second conveyor conveying run is spaced a distance away from the first conveyor conveying run. In operation, transport of the second conveyor conveying belt run ceases upon rotation while the downstream end of the first conveyor conveying run extends beneath it during folding of a sheet. Upon the sheet being folded, the first conveyor conveying run retracts and transports the folded sheet off its downstream end and the second conveyor returns to its first position.

20 Claims, 5 Drawing Sheets

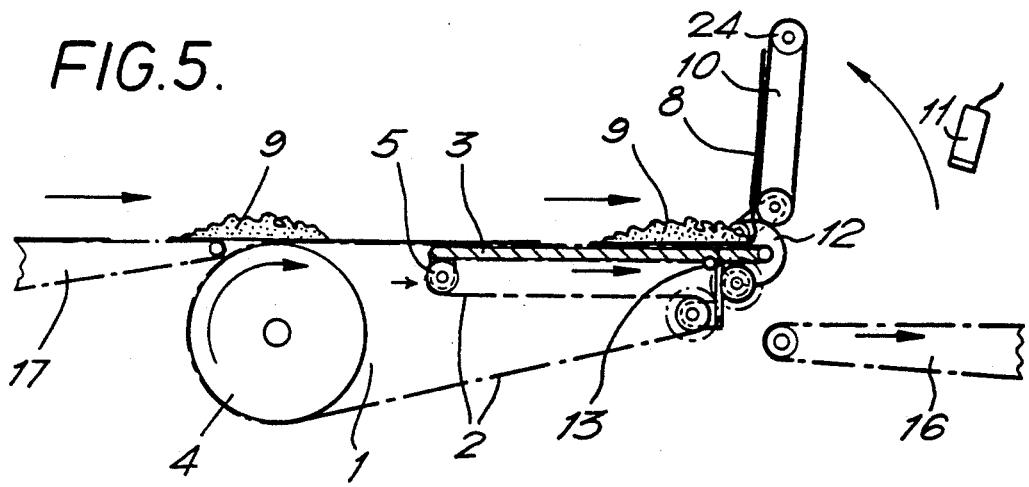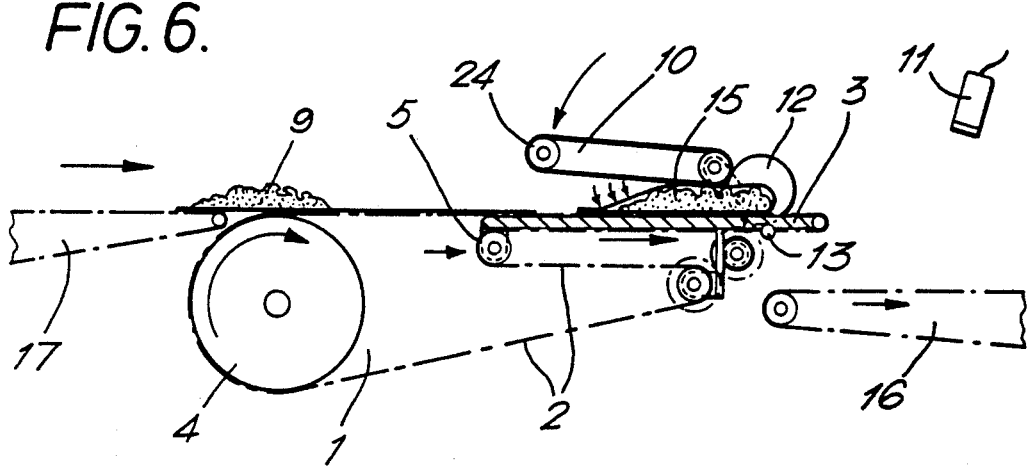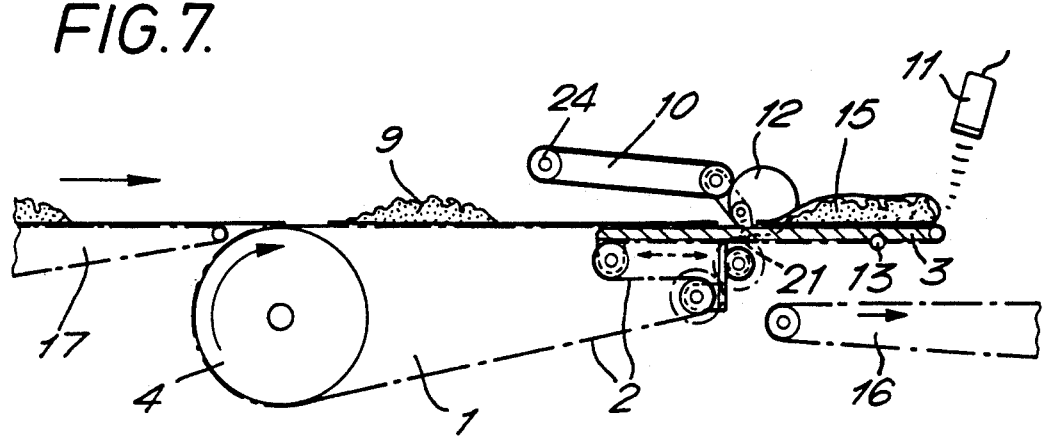

FOLDED ARTICLE PREPARATION FROM PLASTIC MATERIAL SHEETS

BACKGROUND OF THE INVENTION

The present invention relates to an apparatus and process for folding sheets of plastic material such as dough sheets.

The automatic folding of sheeted dough for stuffed bakery products is normally carried out on a continuous conveyor by the use of a type of plough equipment, and this method works well for small products such as pirogues. The plough-shaped apparatus is mounted above a conveyor belt carrying the dough products, and when a product passes beneath the plough, one half of its surface will be lifted and turned over to cover the other half. This principle is suitable if the dough product has a certain thickness and a surface of which is not too large to fold. However, for dough products with little self-stability, such as large sheets of dough having a width of above about 18 cm and a thickness of only about 1 mm, e.g., sheets of dough used for the preparation of Calzone pizzas, the plough method is not satisfactory, and for certain types of dough, it does not work at all. For instance, the half of the surface of the dough that is being lifted and turned collapses before it has covered the other half of the dough.

The methods so far proposed for folding dough sheets having a width above 18 cm involve complicated machinery and the folding precision is easily disturbed by small variations of the dough consistency.

SUMMARY OF THE INVENTION

The present invention provides a process and an apparatus for the automatic folding of sheets of plastic material such as dough sheets, which may be thin and have a large area.

Accordingly, the present invention provides an apparatus for folding a sheet of plastic material which comprises first and second successive conveyors having belts having conveying belt runs for transporting the sheet of plastic material, the first conveyor being adapted so that the belt may travel continuously when in operation, and the second conveyor being adapted to rotate about a transverse axis from a position in longitudinal end-to-end conveying run relationship with the downstream end of the first conveyor to a substantially inverted position above and separated from the first conveyor. In operation, the rotation and inversion of the second conveyor provide for folding a leading part of the sheet on the conveying belt run of the second conveyor onto the rear part of the sheet on the conveying belt run of the first conveyor and when inverted, the conveying belt run of the second conveyor is displaced a distance away from the conveying belt run of the first conveyor to enable the folded sheet to travel to the downstream end of the conveying run of the first conveyor beneath the second conveyor.

In an embodiment of the invention, the first conveyor is retractable, wherein the downstream end of the conveying belt run is reciprocable for extending the run for a distance from a first retracted position to an extended position to extend a length of the run and for retracting the run from the extended position to the retracted position.

The present invention also provides a process for preparing folded articles which comprises advancing a sheet of a foldable plastic material on a conveying belt run of a first conveyor adapted to travel continuously to a conveying belt run of a second conveyor in longitudinal end-to-end conveying run relationship with the downstream end of the conveying belt run of the first conveyor and then rotating the second conveyor about a transverse axis to a substantially inverted position above and separated from the first conveyor so that the leading part of the sheet on the second conveyor conveying run is folded over and comes to lie upon the rear part of the sheet on the first conveyor conveying run and advancing the folded sheet to the downstream end of the first conveyor conveying run beneath the second conveyor.

In an embodiment of the process of the invention, upon pivoting and rotation of the second conveyor, the downstream end of the conveying belt run of the first conveyor is extended by extending the run for a distance in the linear direction of transport from a retracted position to an extended position and then the first conveyor conveying run is retracted and the folded sheet is transported off the downstream end.

The folded sheet may be discharged from the downstream end of the conveying run of the first conveyor onto an outfeed conveyor or directly into a package on a conveyor positioned below the downstream end of the first conveyor conveying run.

DESCRIPTION OF PREFERRED EMBODIMENTS

As indicated above, the first conveyor is conveniently a retractable conveyor having an endless belt adapted to travel continuously. The belt advantageously is trained around a shuttle board capable of reciprocating for extending the belt conveying run for a distance from the retracted position to extend the length of the run and for retracting the run to the retracted position.

The second conveyor may be a flap conveyor with an endless belt adapted to travel only when the conveying belt run of the second conveyor is in a longitudinal end-to-end relationship with the downstream end of the conveying belt run of the first conveyor which, at this time, is in a retracted position.

Means is provided for positioning and pivoting the second conveyor so that the second conveyor is adapted to rotate from the end-to-end relationship with the first conveyor to the substantively inverted position. Conveniently, the second conveyor is pivotally attached at a position at the upstream end of its conveying run to the first conveyor at a position at the downstream end of its conveying run by a hinge, preferably an eccentric hinge positioned on each lateral side of the first conveyor. The first conveyor may be provided with a means, e.g., a cam or pneumatic cylinder which, on movement of the first conveyor to its forward position, activates the hinge which, in turn, forces the second conveyor to rotate around the hinge to the substantially inverted position, preferably at an angle of from 160° to 180°.

For the automatic folding of a plurality of sheets of plastic material transported consecutively along the conveyors, conveniently, after a folded plastic material has been discharged from the downstream end of the conveying run of the first conveyor, the second conveyor reciprocates from its inverted position above the first conveyor back to its position in longitudinal endto-end relationship with the downstream end of the conveying run of the first conveyor.

Advantageously, a sensor means is provided to detect the leading edge of the sheet of plastic material as it is transported on the conveying run of the second conveyor, the sensor means being positioned above the second conveyor, when the upstream end of the second conveyor is positioned in longitudinal end-to-end relationship with the downstream end of the first conveyor, and the sensor means being adapted to activate a means for rotating the second conveyor about a transverse axis to a substantially inverted position above the first conveyor to fold the leading part of the plastic material over so that it comes to lie on the rear part of the plastic material lying on the first conveyor. The sensor means may conveniently be a photocell.

The sheet of plastic material is one which is foldable so that it may be folded onto itself to provide a folded product, and which retains its folded shape after folding, and may be, for instance, a dough-based product suitable for preparing a pizza, preferably having a diameter or width of from 18 to 30 cm and a thickness of from 0.5 to 2 mm. Advantageously, a filling material, which in the case of a dough-based product such as a pizza is edible, is fed onto the rear part of the dough-based product and preferably, the filling covers a substantial area of the rear half of the dough-based product.

Advantageously, several apparatuses of the present invention may be arranged in parallel lanes on a production line. Alternatively, the apparatus of the present invention may comprise first and second conveyors of sufficient width to transport a plurality of sheets side by side, e.g., 2 or 3 sheets of plastic material.

The present invention is illustrated further by way of example only with reference to the accompanying drawings.

BRIEF DESCRIPTION OF THE DRAWINGS

FIGS. 4 to 10 are diagrammatic sectional side plan views representing successive phases of the operation of the apparatus.

DETAILED DESCRIPTION OF THE INVENTION

Figure 1:
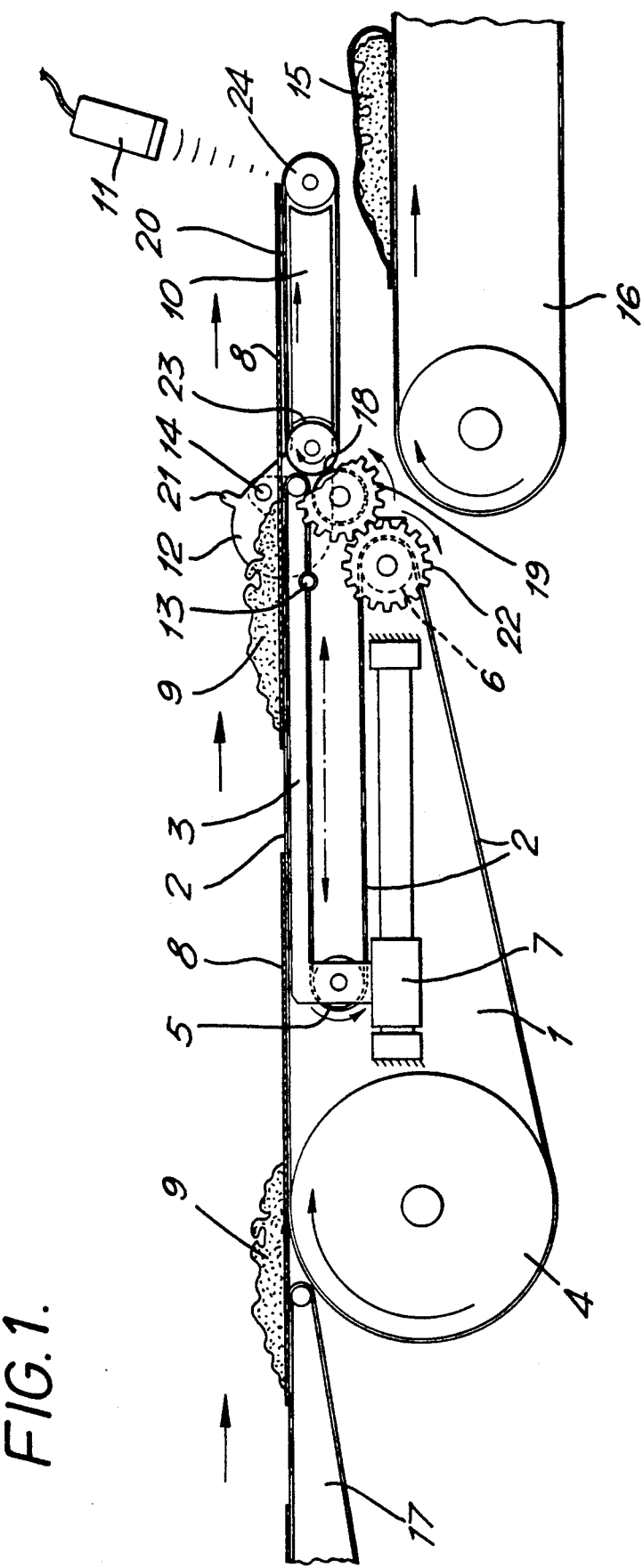
FIG. 1 represents a diagrammatic sectional side view of an apparatus for folding a dough-based product.
Figure 2:
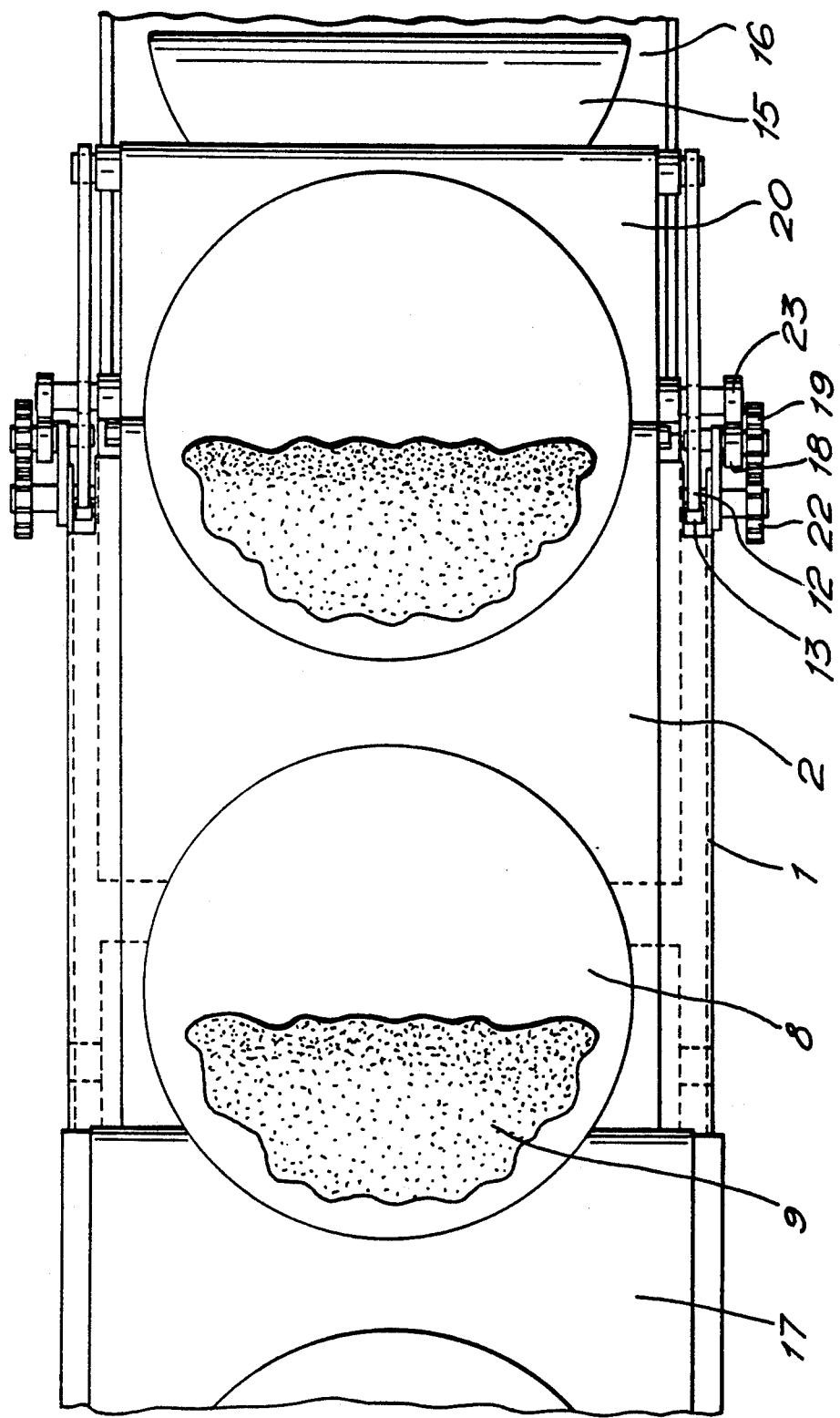
FIG. 2 represents a diagrammatic top plan view of the apparatus of FIG. 1.

Referring to the drawings, a conveyor apparatus unit generally designated by reference character (1) comprises a belt (2) trained around a driving roller (4) and rollers (5) and (6) and about a shuttle board (3) which is reciprocable for extending the conveying belt run for a distance from a retracted position, as illustrated in FIG. 1, to an extended position to extend a length of the conveying run and for retracting the run from the extended position to the retracted position. A flap conveyor (10) comprises an endless belt (20) trained around rollers (23) and (24) and at the downstream end of which, a photocell (11) is positioned at a position above the conveying belt run.

Figure 3:
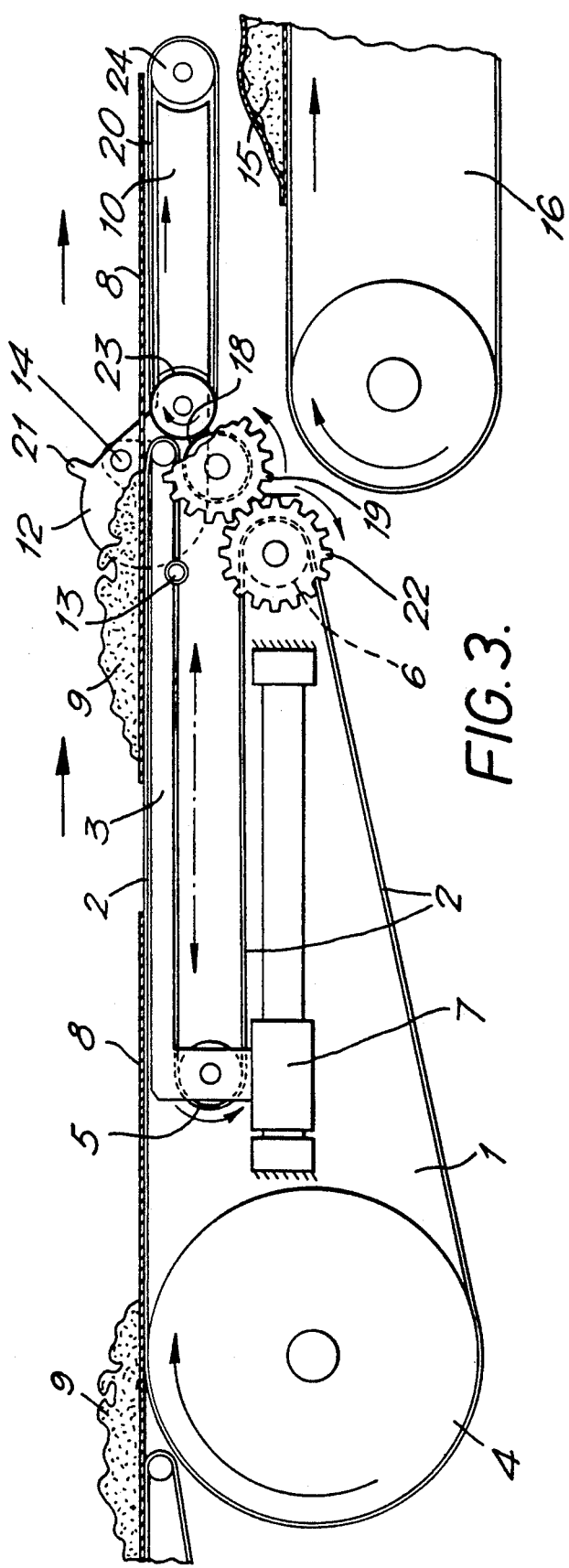
FIG. 3 is an enlarged view of a part of FIG. 1.
Figure 4:
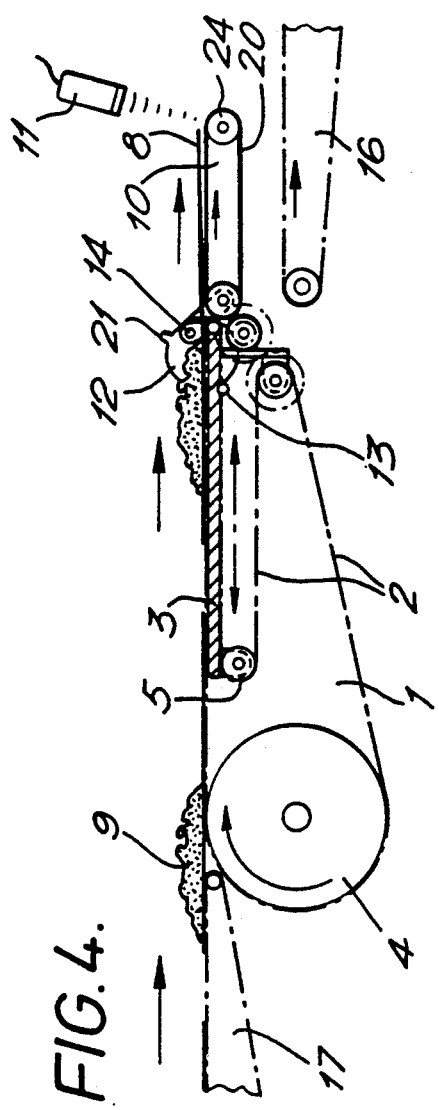

A shuttle board (3) is fixed to a driving unit, which may comprise one or two horizontally positioned pneumatic cylinders (7) to reciprocate the shuttle board (3). The roller (5) is fixed to the shuttle board (3) and will be reciprocated with it. The roller (6) is fixed to the frame of the conveyor unit (1) and is provided at each end with a gear wheel (22) to drive a gear wheel (19) to drive a roller (18). Rollers (18) and (23) are friction-coated and are in contact when the flap conveyor (10) is in its lower position, as shown in FIGS. 1, 3 and 4, whereby the conveyor belt (20) will be driven. When the flap conveyor (10) is turned to an inverted position above the belt (2), as shown in FIGS. 5 to 9, the conveyor belt (20) will not be driven and thus, transport of the conveying run ceases, since rollers (18) and (23) are not in contact.

The flap conveyor (10) is pivoted on each side of the retracting conveyor (1) by an eccentric hinge (12) having a pivot point (14), the two conveying belt runs being sandwiched between the hinges. Projecting from each side of the shuttle board (3) is a cam roller (13).

In operation, as first illustrated in FIG. 4, the dough-based sheets (8), having a diameter of 27.5 cm and a thickness of 1 mm and being covered on the rear half of their surfaces with filling (9), are transported in a linear direction upstream to downstream on the conveying runs of each of an infeed conveyor (17), belt (2) and belt (20) in the direction of the arrows.

When, as illustrated in FIG. 5, the non-covered half of the surface of sheets (8) has reached the downstream end of the flap conveyor belt (20) below the photocell (11), the photocell (11) will give a signal to a solenoid valve (not shown) to activate the cylinder (7) to move the shuttle board (3) to extend the belt (2) conveying run in the linear direction of transport for a distance from the retracted to the extended position.

When, as illustrated in FIG. 6, the shuttle board (3) moves to extend the belt conveying run surface, the cam roller (13) presses on the eccentric hinge (12) and forces the flap conveyor (10) to turn around its pivot point (14) and thereby lift and turn and invert the half of the dough piece (8), which is not covered with filling above the other half to make a folded product (15).

Figure 8:
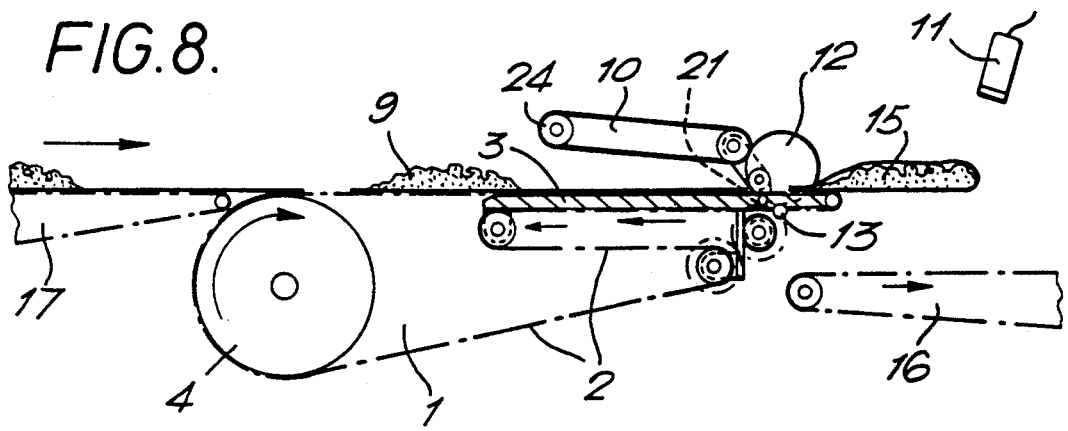
Figure 9:
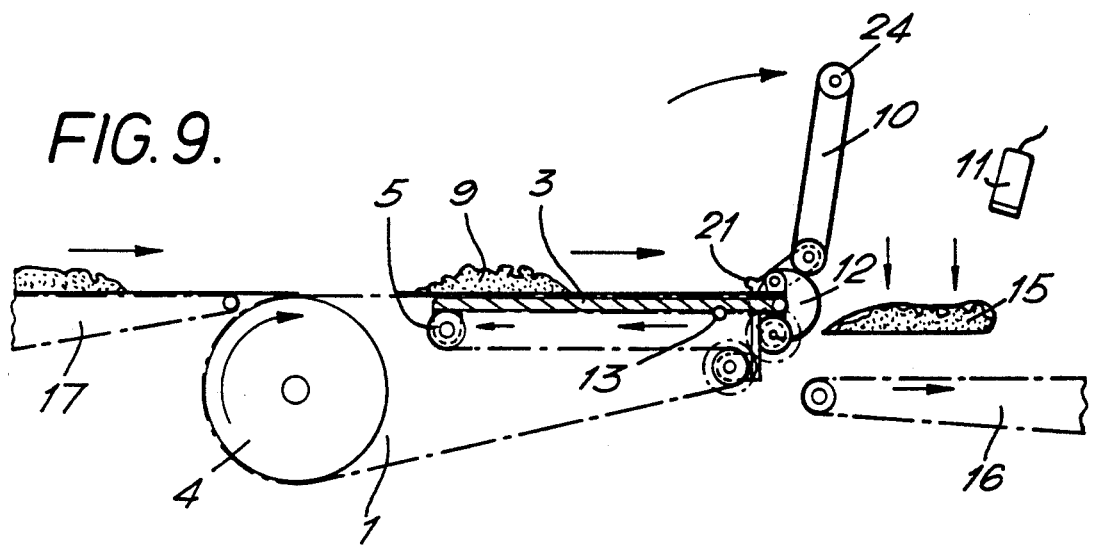

As illustrated in FIG. 7, the shuttle board (3) has now extended the conveying run of belt (2) to its most extended downstream end position, and the transported folded product (15) is at a position on belt (2) below the photocell (11), which will give a signal via the solenoid valve to activate cylinder (7) to retract the shuttle board (3), and the transported folded product (15) is dropped onto an outfeed conveyor (16) located below the flap conveyor, as illustrated in FIGS. 8 and 9.

Figure 10:
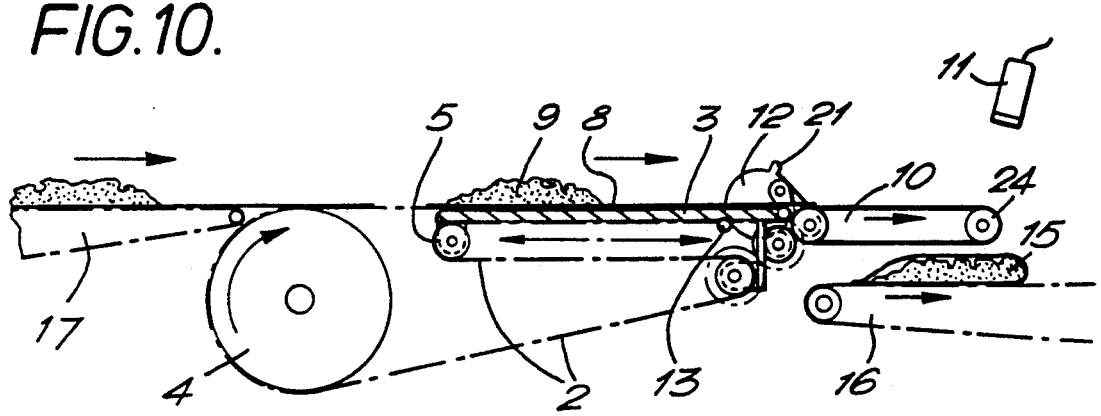

When the shuttle board (3) retracts, the cam roller (13) presses on the cam (21) of the eccentric hinge (12) and forces the flap conveyor (10) to turn back to its lower position, as illustrated in FIG. 10.

A time delay relay is set to avoid the photocell (11) being activated by the flap conveyor (10) as the flap conveyor passes below the photocell while turning to its raised and lowered positions.

I claim:

1. A conveyor apparatus for preparing folded articles comprising:
    a first conveyor having a conveying belt run for conveying a sheet of foldable plastic material and having a downstream run end which is reciprocable for extending the run for a distance from a retracted position to an extended position to extend a length of the run and for retraced position;
    a second conveyor having a conveyor belt run for conveying a sheet of foldable plastic material from an upstream belt run end towards a downstream run end;

means attached to the second conveyor for positioning and pivoting the second conveyor so that the second conveyor is rotatable from a first position, wherein the first and second conveyor conveying belt runs are in a longitudinal end-to-end conveying run relation for conveying a sheet of a foldable material from the first conveyor conveying belt run to the second conveyor conveying belt run, to a second position above the first conveyor conveying belt run so that at the second position, the second conveyor is, with respect to the first position, substantially inverted and so that the second conveyor conveying belt run is spaced a distance away from the first conveyor conveying belt run; and means for rotating the second conveyor about the pivoting means.

2. An apparatus according to claim 1 wherein first conveyor has a reciprocable shuttle board for extending and retracting the first conveyor conveying belt run.

3. An apparatus according to claim 1 wherein the first conveyor includes the rotating means and further comprises means for activating the rotating means to rotate the second conveyor.

4. An apparatus according to claim 3 wherein the rotating means is activated upon movement which extends the first conveyor conveying belt run.

5. An apparatus according to claim 1 wherein the means for positioning and pivoting is attached to each of the first and second conveyors.

6. An apparatus according to claim 5 wherein the means for positioning and pivoting are two eccentric hinges positioned so that the first and second conveyor conveying belt runs are sandwiched between the hinges.

7. An apparatus according to claim 6 wherein the rotating means is a cam connected with each hinge and a roller positioned adjacent each cam for pressing against each cam to force the cams to force the hinges to rotate the second conveyor.

8. An apparatus according to claim 7 wherein the first conveyor has a reciprocable shuttle board for extending and retracting the first conveyor conveying belt run and wherein the roller adjacent each cam is connected to the shuttle board.

9. An apparatus according to claim 8 wherein a pneumatic cylinder is connected to the shuttle board for reciprocating the shuttle board.

10. An apparatus according to claim 6 wherein the rotating means is a pneumatic cylinder connected to each hinge.

11. An apparatus according to claim 1 wherein the first and second conveyors are positioned so that when the conveying belt runs of each conveyor are in a longitudinal end-to-end relation, a roller of the first conveyor contacts a second conveyor belt drive roller positioned at the second conveyor upstream end to drive the second conveyor roller and conveying belt run.

12. An apparatus according to claim 1 wherein a sensor means is positioned at a position relative to the second conveyor conveying belt run for detecting a leading edge of a sheet and for, upon edge detection, providing a signal for activating the means for rotating the second conveyor.

13. A process for preparing folded articles comprising:
transporting conveying belt runs of each of a first conveyor and of a second conveyor in a first position and transporting a sheet of a foldable plastic material in a linear direction on a conveying run of the first conveyor and from a downstream end of the first conveying run to an upstream end of a conveying run of the second conveyor and on the second conveyor conveying run so that a portion of the sheet is positioned on the conveying runs of each conveyor;
rotating the second conveyor, while ceasing the transport of the second conveyor conveying belt run upon rotation and while extending the downstream end of the first conveyor conveying run for a distance in the linear direction of transport from a retracted position to an extended position, about an upstream end pivot and about the downstream end of the first conveyor to a second position so that at the second position, the second conveyor is, with respect to the first position, substantially inverted and positioned above the first conveyor conveying run for folding the sheet and spaced a distance away from the first conveyor conveying run so that the folded sheet is transported on the first conveyor conveying run beneath the second conveyor; and
retracting the first conveyor conveying run and transporting the folded sheet off the downstream end of the first conveyor conveying run and rotating the second conveyor about the pivot so that, upon retraction of the first conveyor conveying run to the retracted position, the second conveyor is rotated to the first position for receiving and transporting a further sheet of material transported from the first conveyor conveying run.

14. A process according to claim 13 wherein the sheet is a dough.

15. A process according to claim 14 further comprising feeding a filling onto a portion of the sheet on the first conveyor conveying run.

16. A process according to claim 15 wherein the sheet and filling material are suitable for preparing a pizza product.

17. A process according to claim 13 wherein the second conveyor is rotated, with respect to the first position, 160° to 180° from the first position to the second position.

18. A process according to claim 13 further comprising detecting a leading edge of the sheet on the second conveyor conveying run for activating rotation of the second conveyor.

19. A process according to claim 13 wherein rotation of the second conveyor is activated by movement which extends the first conveyor conveying run.

20. A process according to claim 13 wherein the second conveyor conveying run is transported by transporting the first conveyor conveying run to drive a first conveyor roller to, in turn, drive a second conveyor roller for transporting and driving the second conveyor conveying run, whereby upon rotation of the second conveyor, the rollers are separated from contact and transport of the second conveyor conveying run ceases.

* * * * *

UNITED STATES PATENT AND TRADEMARK OFFICE
CERTIFICATE OF CORRECTION

PATENT NO. : 5,328,709
DATED : July 12, 1994
INVENTOR(S) : Hans K. LARSEN

It is certified that error appears in the above-indentified patent and that said Letters Patent is hereby corrected as shown below:

Column 4, line 64 (line 8 of claim 1), after "for", insert --retracting the run end from the extended position to the--.

Signed and Sealed this

Sixth Day of September, 1994

Attest:

BRUCE LEHMAN

Attesting Officer

Commissioner of Patents and Trademarks